US012601276B2

(12) United States Patent
Lents et al.

(10) Patent No.:  US 12,601,276 B2
(45) **Date of Patent:  *Apr. 14, 2026**

(54) HIGH EFFICIENCY AIRCRAFT PARALLEL HYBRID GAS TURBINE ELECTRIC PROPULSION SYSTEM

(71) Applicant: RTX Corporation, Farmington, CT (US)

(72) Inventors: Charles E. Lents, Amston, CT (US); Christopher J. Hanlon, Sturbridge, MA (US); Larry W. Hardin, East Hartford, CT (US); Jonathan Rheaume, West Hartford, CT (US)

(73) Assignee: RTX Corporation, Farmington, CT (US)

( * ) Notice: Subject to any disclaimer, the term of this patent is extended or adjusted under 35 U.S.C. 154(b) by 1903 days.

This patent is subject to a terminal disclaimer.

(21) Appl. No.: 15/200,128

(22) Filed: Jul. 1, 2016

(65) Prior Publication Data

US 2018/0003071 A1      Jan. 4, 2018

(51) Int. Cl.
*F01D 15/10*          (2006.01)
*B64D 27/10*          (2006.01)
          (Continued)

(52) U.S. Cl.
CPC ............. *F01D 15/10* (2013.01); *B64D 27/10* (2013.01); *B64D 27/35* (2024.01); *B64D 41/00* (2013.01);
          (Continued)

(58) Field of Classification Search
CPC .... F02K 3/06; F02K 5/00; F02C 7/268; F02C 7/275; F01D 15/01; F05D 2220/03
See application file for complete search history.

(56) References Cited

U.S. PATENT DOCUMENTS

| | | | | |
|---|---|---|---|---|
| 4,517,796 A | * | 5/1985 | McCombs, Jr. .......... | F02C 9/28 60/39.281 |
| 5,899,411 A | | 5/1999 | Latos et al. | |

(Continued)

OTHER PUBLICATIONS

Wikipedia, CFM International CFM56, Feb. 13, 2013, Wikipedia (Year: 2013).*

(Continued)

*Primary Examiner* — Kyle Robert Thomas
(74) *Attorney, Agent, or Firm* — Carlson, Gaskey & Olds, P.C.

(57)          ABSTRACT
A gas turbine engine includes a compressor section having a first compressor and a second compressor, the second compressor having a higher pressure than the first compressor, and a turbine section having a first turbine and a second turbine, the second turbine having a higher pressure than the first turbine. The first compressor is connected to the first turbine via a first shaft. The second compressor is connected to the second turbine via a second shaft. An electric motor is connected to the first shaft such that rotational energy generated by the electric motor is translated to the first shaft. A fan is connected to the first shaft via a gear system. The gas turbine engine includes at least a takeoff mode of operations, a top of climb mode of operations and a maximum cruise mode of operations. The gas turbine engine is sized to operate at peak efficiency in the maximum cruise mode of operations.

8 Claims, 3 Drawing Sheets

(51) Int. Cl.

| | |
|---|---|
| *B64D 27/35* | (2024.01) |
| *B64D 41/00* | (2006.01) |
| *F02C 6/14* | (2006.01) |
| *F02C 7/36* | (2006.01) |
| *B64D 27/33* | (2024.01) |

(52) U.S. Cl.

CPC .................. *F02C 6/14* (2013.01); *F02C 7/36* (2013.01); *B64D 27/33* (2024.01); *F05D 2220/76* (2013.01); *F05D 2240/60* (2013.01)

(56) References Cited

U.S. PATENT DOCUMENTS

| | | | |
|---|---|---|---|
| 7,117,683 | B2 | 10/2006 | Thompson |
| 7,380,749 | B2 | 6/2008 | Fucke et al. |
| 7,882,691 | B2 | 2/2011 | Lemmers, Jr. et al. |
| 7,997,085 | B2* | 8/2011 | Moniz .................... F01D 15/10 60/778 |
| 8,727,270 | B2 | 5/2014 | Burns et al. |
| 10,774,741 | B2* | 9/2020 | Sennoun ................... F02K 3/06 |
| 11,371,430 | B2* | 6/2022 | Lents ......................... F02C 3/24 |
| 11,428,170 | B2* | 8/2022 | Lents .................... B64D 31/06 |
| 2006/0102790 | A1 | 5/2006 | Atkey et al. |
| 2006/0260323 | A1 | 11/2006 | Moulebhar |
| 2007/0151258 | A1 | 7/2007 | Gaines et al. |
| 2008/0070078 | A1 | 3/2008 | Gummalla et al. |
| 2009/0113896 | A1* | 5/2009 | Fukuda .................... F02C 6/08 60/784 |
| 2012/0138737 | A1 | 6/2012 | Bruno et al. |
| 2012/0177485 | A1* | 7/2012 | Virkler ................. F01D 5/3015 415/173.7 |
| 2013/0076120 | A1* | 3/2013 | Wagner ................... F01D 15/10 307/9.1 |
| 2013/0192200 | A1* | 8/2013 | Kupratis ................ F02K 3/072 60/226.3 |
| 2014/0245748 | A1* | 9/2014 | Anghel ................... F01D 15/10 60/783 |
| 2014/0331686 | A1* | 11/2014 | Gulen .................... F01K 23/10 60/783 |
| 2014/0338352 | A1* | 11/2014 | Edwards ................ F02C 3/113 60/774 |
| 2016/0319681 | A1* | 11/2016 | Jendrix .................. F01D 11/02 |
| 2017/0211474 | A1* | 7/2017 | Sennoun .................. F02C 7/00 |

OTHER PUBLICATIONS

Klein, Dominik, Modelling of a Turbojet Gas Turbine Engine, Sep. 2015 ResearchGate (Year: 2015).*

Wikipedia, JATO, Feb. 10, 2015, Wikipedia (Year: 2015).*

* cited by examiner

HIGH EFFICIENCY AIRCRAFT PARALLEL HYBRID GAS TURBINE ELECTRIC PROPULSION SYSTEM

TECHNICAL FIELD

The present disclosure relates generally to high efficiency gas turbine engines, and more specifically to a gas turbine engine including an electric motor booster. The subject of this disclosure was made with government support under Contract No.: NNC14CA32C awarded by NASA. The government therefore may have certain rights in the disclosed subject matter.

BACKGROUND

Gas turbine engines compress air in a compressor section, combine the compressed air with a fuel, ignite the mixture in a combustor section, and expand the resultant combustion products across a turbine section. The expansion of the combustion products drives the turbine section to rotate. The turbine section is connected to the compressor section via one or more shafts, and the rotation of the turbine section drives the rotation of the compressor section. In turbofan gas turbine engines, a fan is similarly connected to a shaft, and driven to rotate by the turbine section. Further, in a geared turbofan, there is a gear set driven by the shaft allowing the fan to rotate at a different (slower) speed than the shaft.

Typical gas turbine engines are designed such that the peak operational efficiency occurs when the engine is operated during one or both of takeoff or top of climb (alternately referred to as climb out) conditions. During these conditions, the gas turbine engine requires the maximum amounts of thrust output of all the operational modes. The efficiency designs impact the size of the engine components, and the temperatures at which the engine components run during each phase of engine operations. By way of example, during cruise operations, an aircraft requires less thrust, and the gas turbine engine is operated at cooler temperatures. Since the typical gas turbine engine is designed for peak efficiency during takeoff or top of climb, the turbine inlet temperature is at its maximum allowable limit for best efficiency and highest thrust, and the gas turbine engine is operated at a lower efficiency during other modes, such as maximum cruise, where the turbine inlet temperature is below the maximum allowable limit.

SUMMARY OF THE INVENTION

In one exemplary embodiment a gas turbine engine includes a compressor section having a first compressor and a second compressor, the second compressor having a higher pressure than the first compressor, a turbine section having a first turbine and a second turbine, the second turbine having a higher pressure than the first turbine, the first compressor is connected to the first turbine via a first shaft, the second compressor is connected to the second turbine via a second shaft, an electric motor is connected to the first shaft such that rotational energy generated by the electric motor is translated to the first shaft, a fan is connected to the first shaft via a gear system, and wherein the gas turbine engine includes at least a takeoff mode of operations, a top of climb mode of operations and a maximum cruise mode of operations, the gas turbine engine being sized to operate at peak efficiency in the maximum cruise mode of operations.

In another example of the above described gas turbine engine operating the engine at peak efficiency comprises operating the engine at a maximum turbine inlet temperature of the second turbine.

In another example of any of the above described gas turbine engines the electric motor is a motor/generator.

In another example of any of the above described gas turbine engines the electric motor is connected to the first shaft via a towershaft.

Another example of any of the above described gas turbine engines further includes a fan section forward of the first compressor, the fan section including a fan connected to the first shaft via a geared architecture.

In another example of any of the above described gas turbine engines the cruise mode of operations requires less thrust than the takeoff mode of operations and the top of climb mode of operations.

In another example of any of the above described gas turbine engines a geometry of the gas turbine engine is physically sized such that a turbine inlet temperature of the second turbine is at a maximum while the engine is in the maximum cruise mode of operations.

In another example of any of the above described gas turbine engines a flow rate through the gas turbine engine is configured to be controlled by a controller such that the turbine inlet temperature of the second turbine is at a maximum while the engine is in the maximum cruise mode of operations.

An exemplary method for operating a gas turbine engine includes operating a gas powered turbine engine at a peak efficiency during a first mode of operations, and providing power to the gas turbine engine from an electric motor when the engine is operating in a second mode of operations, where the second mode of operations has a higher thrust requirement than the first mode of operations.

In another example of the above described exemplary method for operating a gas turbine engine operating the engine at the peak efficiency comprises operating the gas turbine engine at a maximum turbine inlet temperature of a turbine.

In another example of any of the above described exemplary methods for operating a gas turbine engine the first mode of operations is a maximum cruise flight condition.

In another example of any of the above described exemplary methods for operating a gas turbine engine the second mode of operations is one of a takeoff flight condition and a top of climb flight condition.

Another example of any of the above described exemplary methods for operating a gas turbine engine further includes providing a maximum amount of power from the gas powered turbine engine during the second mode of operations.

In another example of any of the above described exemplary methods for operating a gas turbine engine the engine includes a first shaft connecting a first turbine to a first compressor and a second shaft connecting a second turbine to a second compressor, the first compressor is a lower pressure than the second compressor, and wherein providing power to the gas turbine engine comprises boosting a rotation of a first shaft using the electric motor.

Another example of any of the above described exemplary methods for operating a gas turbine engine further includes generating electricity using the electric motor during at least the first mode of operations.

Another example of any of the above described exemplary methods for operating a gas turbine engine further includes storing generated electricity in an energy storage component.

In one exemplary embodiment a gas turbine engine includes a core having a compressor section, a combustor section and a turbine section, wherein the core is undersized relative to an amount of thrust required in at least one flight condition, and an electric motor connected to the core and configured to provide rotational power to the core while the gas turbine engine is in the at least one flight condition.

In another example of the above described gas turbine engine the at least one flight condition is one of a takeoff and a top of climb condition.

In another example of any of the above described gas turbine engines a geometry of the gas turbine engine is physically sized such that a turbine inlet temperature of the turbine section is at a maximum while the engine is at a maximum takeoff thrust mode of operations, a maximum top of climb thrust mode of operations and a maximum cruise thrust mode of operations.

In another example of any of the above described gas turbine engines a flow rate through the gas turbine engine is configured to be controlled by a controller such that a turbine inlet temperature of the turbine section is at a maximum while the engine is in a maximum cruise thrust mode of operations.

These and other features of the present invention can be best understood from the following specification and drawings, the following of which is a brief description.

DETAILED DESCRIPTION OF AN EMBODIMENT

Figure 1:
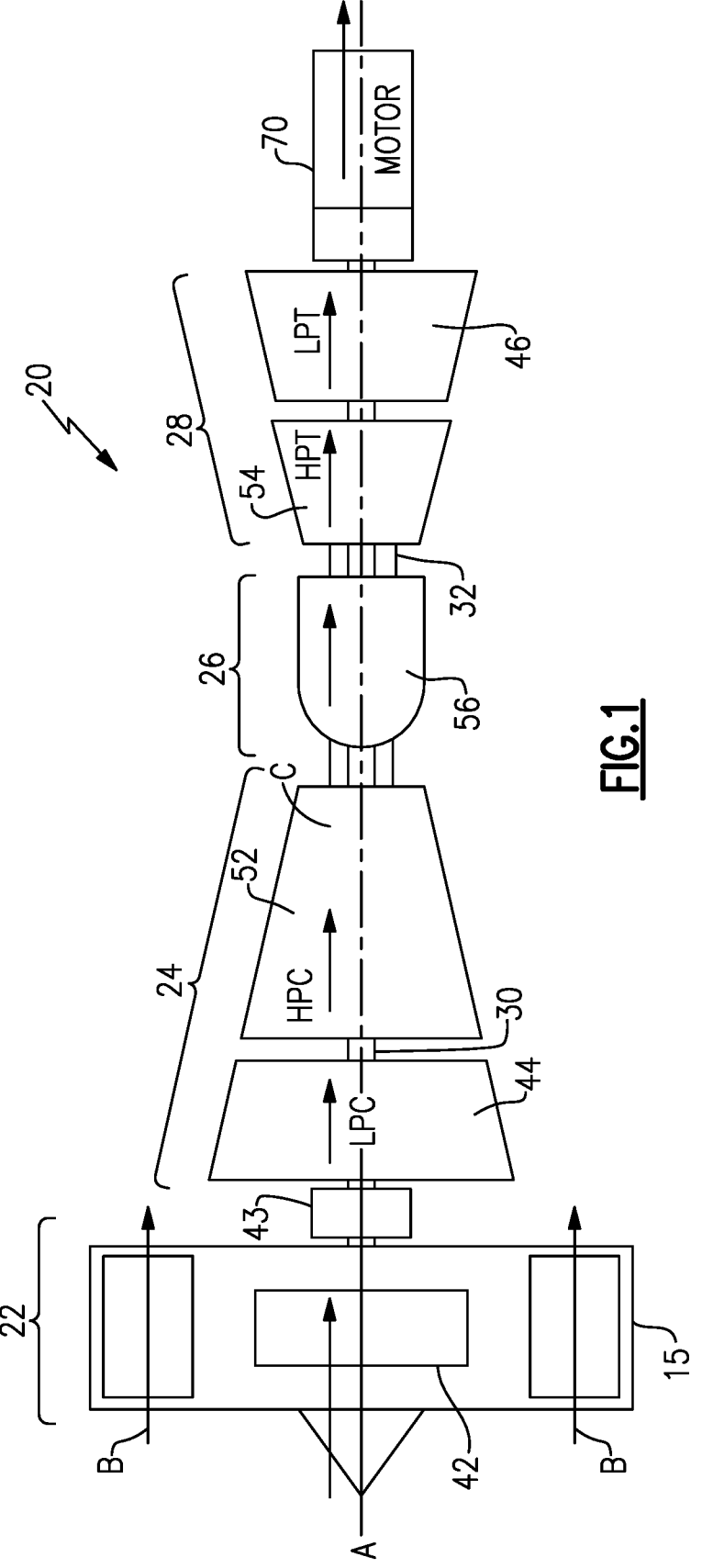
FIG. 1 schematically illustrates an exemplary gas turbine engine according to one embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool and geared turbofan architectures.

The exemplary engine 20 generally includes a low speed spool 30 and a high speed spool 32 mounted for rotation about an engine central longitudinal axis A relative to an engine static structure via several bearing systems. It should be understood that various bearing systems at various locations may be provided.

The low speed spool 30 generally includes an inner shaft that interconnects a fan 42, a first (or low) pressure compressor 44 and a first (or low) pressure turbine 46. The inner shaft is connected to the fan 42 through a speed change mechanism (gear system 43), which in exemplary gas turbine engine 20 is illustrated as a geared architecture to drive the fan 42 at a lower speed than the low speed spool 30. The high speed spool 32 includes an outer shaft that interconnects a second (or high) pressure compressor 52 and a second (or high) pressure turbine 54. A non-rotating combustor 56 is arranged in the exemplary gas turbine 20 between the high pressure compressor 52 and the high pressure turbine 54. In some examples, a mid-turbine frame of the engine static structure is arranged generally between the high pressure turbine 54 and the low pressure turbine 46. The mid-turbine frame further supports bearing systems within the turbine section 28. The inner shaft and the outer shaft are concentric and rotate via bearing systems about the engine central longitudinal axis A, which is collinear with the longitudinal axes of the inner shaft and the outer shaft.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 43 may be varied. For example, gear system 43 may be located aft of combustor section 26 or even aft of turbine section 28, and fan section 22 may be positioned forward or aft of the location of gear system 43.

The engine 20 in one example is a high-bypass geared aircraft engine. In a further example, the engine 20 bypass ratio is greater than about six (6), with an example embodiment being greater than about ten (10), the geared architecture 43 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared system 43 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

In some examples, an electric motor 70 is incorporated into the engine 20 and is capable of generating rotation using the electric power from an on-board energy source. The rotation is provided to the low speed spool 30 via a mechanical connection. In some examples, a motor/generator can be utilized as the generator 70 and rotational energy can be converted to electric energy and stored in an energy storage device during some modes of operation. In either example, the rotational energy can be used to further supplement the operations of the gas turbine engine 20 during one or more modes of operation.

Figure 3:
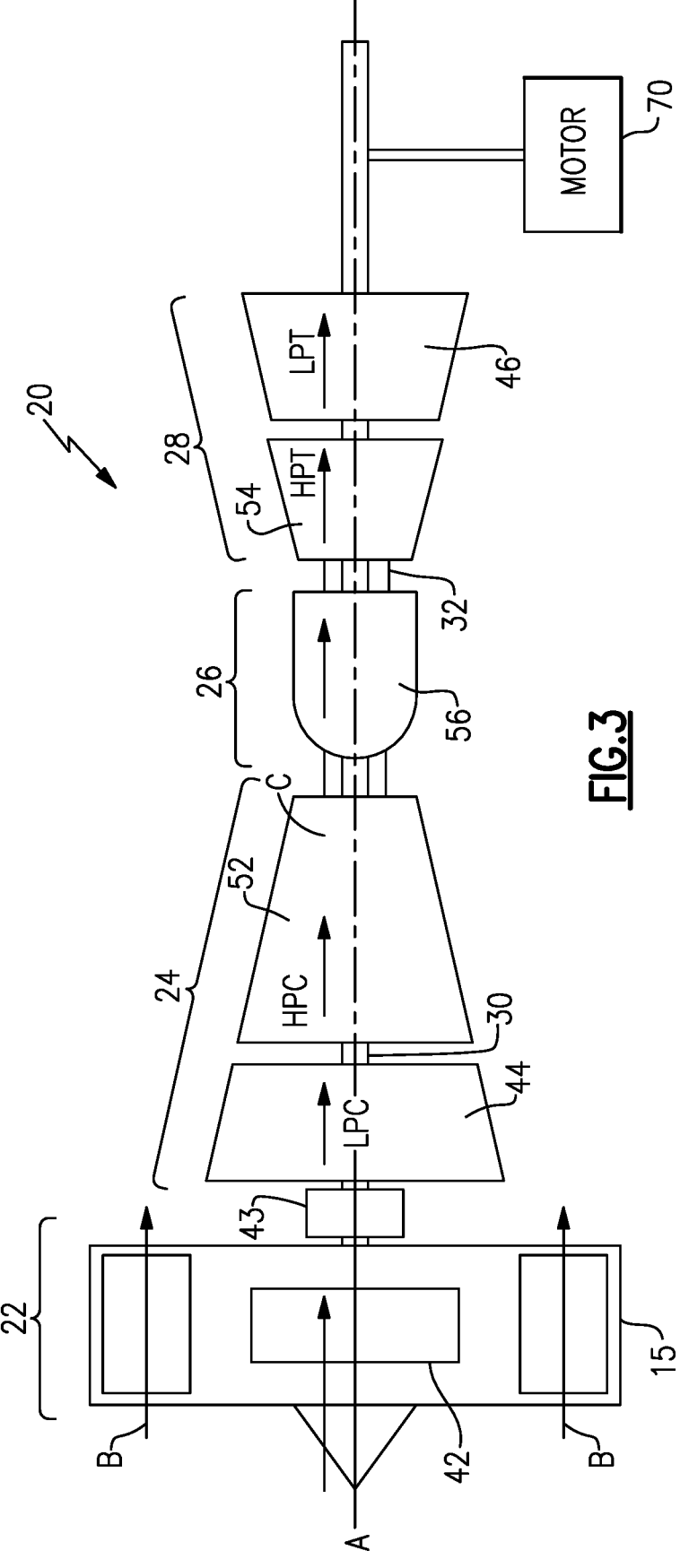
FIG. 3 schematically illustrates an exemplary gas turbine engine according to one embodiment.

While illustrated in the example of FIG. 1 as being positioned aft of the low pressure turbine 46, one of skill in the art, having the benefit of this disclosure, will understand that the motor 70 can be placed at alternative axial positions within the gas turbine engine, and provide similar functions. By way of example, in some practical engines, the motor 70 can be radially outward of the primary flowpath, and interconnected with the low speed spool 30 via a tower shaft, or similar interconnection. FIG. 3 illustrates one such example.

In one such embodiment, the gas turbine engine 20 is sized such that the engine 20 operates at peak efficiency during maximum cruise conditions, thereby ensuring that the engine operates at maximum efficiency over the majority of the engine's flight time. While operating at peak efficiency, the engine 20 is operated at its maximum allowable temperature for climb while engine 20 is at the maximum thrust cruise condition, with an inlet temperature of the high pressure turbine section 54 at the maximum allowable temperature for the corresponding mode of operations. The maximum allowable temperature for a given mode of operations is determined by minimum engine life cycle length requirements.

The sizing of the engine 20 for peak efficiency at maximum cruise includes optimally sizing the physical structures (geometry) of the gas turbine engine 20, as well as controlling the core flow through the gas turbine engine 20. In some examples, the core flow is controlled by one or more engine components in conjunction with an on-board engine controller. The particular sizing parameters can be determined for a specific engine by one of skill in the art according to known principles.

It should be understood, that when an engine is sized to provide peak efficiency during maximum cruise conditions, the engine may not be capable of providing sufficient thrust for all take off, top of climb, or similar engine operational modes. This is referred to as the engine being undersized for take off, top of climb, or similar engine operational modes. In such examples, the motor 70 is configured and/or controlled by an engine controller to provide boost power to the rotation of the low speed spool 30, thereby achieving sufficient power for takeoff and top of climb operations. In this way the motor 70 operates as a boost motor during at least one mode of operations of the gas turbine engine 20.

While specific values for core flow, bypass ratios and motor powers have not been provided in detail above, one of skill in the art, having the benefit of this disclosure, will understand that the values will vary depending on the construction and application of a given turbine engine. Further, one of skill in the art, having the benefit of this disclosure, will be able to determine appropriate values based on the specific operational requirements of the gas turbine engine, without requiring substantial experimentation.

Figure 2:
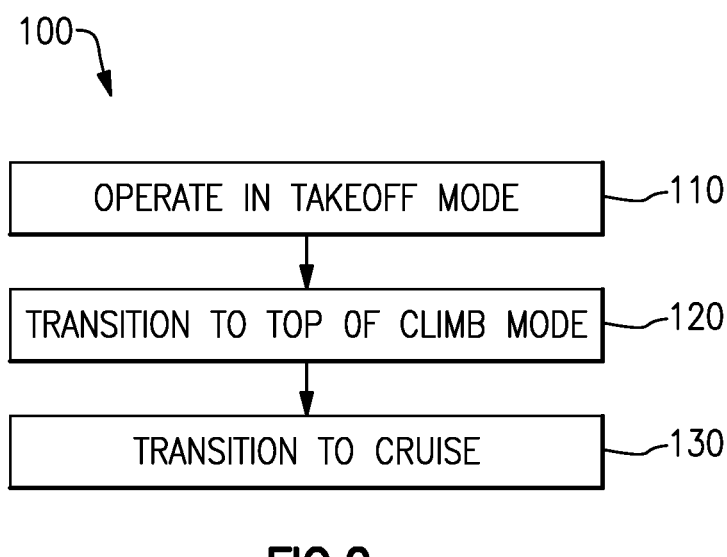
FIG. 2 illustrates a method of operating the gas turbine engine of FIG. 1 through multiple modes of operation.

With continued reference to the engine 20 of FIG. 1, FIG. 2 illustrates a method 100 for operating the engine 20 through multiple modes of operation. Initially the engine is operated in a takeoff mode of operation at "Operate in takeoff mode" step 110. During the takeoff mode of operations, the engine 20 requires sufficient thrust to generate lift and allow the aircraft to get off the ground, as well as to make the initial ascent. Due to the efficiency optimization of the gas turbine engine 20, described above, the engine 20 can in some examples have insufficient available thrust to complete the takeoff. As a result, an engine controller causes the electric motor 70 to provide rotational input power to the low speed spool 30. This additional power is combined with the power generated by the low pressure turbine 46, and the gear system 43 translates the combined power from the low pressure turbine 46 and the electric motor 70 to the fan 42, and provides sufficient thrust for takeoff.

As the aircraft approaches a desired altitude, the engine operations are changed, and the engine controller transitions the engine operations to a top of climb mode of operations in a "Transition to top of climb mode" step 120. While in the top of climb mode, a thrust profile is provided by the engine in order to sufficiently allow the engine to shift from ascending to flying at a constant altitude. As with the take off mode, the electric motor 70 is utilized to provide supplemental power during the top of climb mode, and allows the engine 20 to provide sufficient power to the fan 42 to generate the needed amount of thrust.

Once the aircraft has leveled off at the desired altitude, the engine controller transitions the engine 20 into a cruise mode of operation in a "transition to cruise" step 130. During the cruise mode, the engine 20 is able to provide sufficient thrust, while operating at peak efficiency, without requiring the assistance of the electric motor 70, and the engine controller turns off the electric motor 70.

In some examples, the electric motor 70 can be a motor/generator, and can operate to generate power when it is not providing boost power to the engine 20 such as during cruise operations. In such an example, the energy can be utilized to power on-board aircraft systems via any known power distribution system. In yet further systems, the electric energy generated by the motor 70 while it is operating as a generator can be stored in an on-board energy storage component, and the power can be later utilized by the engine 20 or the aircraft in any desired capacity.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An aircraft including a gas turbine engine comprising:
   a core including a compressor section having a first compressor and a second compressor, the second compressor having a higher pressure than the first compressor, a turbine section having a first turbine and a second turbine, the second turbine having a higher pressure than the first turbine, the first compressor is connected to the first turbine via a first shaft, the second compressor is connected to the second turbine via a second shaft;
   an electric motor connected to the first shaft such that rotational energy generated by the electric motor is translated to the first shaft, the electric motor being connected to an on-board energy storage device such that the electric motor is capable of generating rotation using the electric power from the on-board energy storage device during takeoff;
   a fan connected to the first shaft via a gear system and the gear system is configured to translate a combined power from the first turbine and the electric motor to the fan to provide thrust for takeoff; and
   wherein the gas turbine engine includes at least a takeoff mode of operations, a top of climb mode of operations and a maximum cruise mode of operations;
   the gas turbine engine being configured to operate at a maximum allowable inlet temperature of the second turbine while operating in said maximum cruise mode of operations, the inlet temperature of the second turbine corresponding to a thrust output of the core;

wherein an aircraft thrust requirement on the gas turbine engine in at least one of the takeoff mode of operations and the top of climb mode of operations is higher than a thrust requirement in the maximum cruise mode of operations; and wherein the engine core has insufficient available thrust to complete a takeoff mode of operations due to being configured to operate at the maximum inlet temperature of the second turbine in said maximum cruise mode of operations.

2. The aircraft of claim 1, wherein the electric motor is a motor/generator.

3. The aircraft of claim 1, wherein the electric motor is connected to the first shaft via a towershaft.

4. The aircraft of claim 1, further comprising a fan section forward of the first compressor, the fan section including the fan.

5. The aircraft of claim 1, wherein a geometry of the gas turbine engine is physically sized such that a turbine inlet temperature of the second turbine is at a maximum while said engine is in said maximum cruise mode of operations.

6. The aircraft of claim 1, wherein a flow rate through the gas turbine engine is configured to be controlled by a controller such that the turbine inlet temperature of the second turbine is at a maximum while said engine is in said maximum cruise mode of operations.

7. The aircraft of claim 1, wherein the electric motor is configured to provide rotational input power to the first shaft during at least one of the takeoff mode of operations and the top of climb mode of operations.

8. The aircraft of claim 7, wherein the electric motor is configured to provide rotational input power to the first shaft during each of the takeoff mode of operations and the top of climb mode of operations.

\* \* \* \* \*